United States Patent
Jin et al.

(10) Patent No.: US 9,137,036 B2
(45) Date of Patent: Sep. 15, 2015

(54) METHOD AND APPARATUS FOR PROCESSING EVENT IN HOME NETWORK

(75) Inventors: Ho Jin, Yongin-si (KR); In-chul Hwang, Suwon-si (KR); Mun-jo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1298 days.

(21) Appl. No.: 12/358,431

(22) Filed: Jan. 23, 2009

(65) Prior Publication Data

US 2009/0193438 A1   Jul. 30, 2009

Related U.S. Application Data

(60) Provisional application No. 61/023,642, filed on Jan. 25, 2008.

(30) Foreign Application Priority Data

Jun. 19, 2008   (KR) .................. 10-2008-0058019

(51) Int. Cl.
  *G06F 9/54*   (2006.01)
  *H04L 12/28*   (2006.01)
  *G06F 15/167*   (2006.01)

(52) U.S. Cl.
  CPC ................ *H04L 12/2838* (2013.01)

(58) Field of Classification Search
  USPC ....................................................... 719/318
  See application file for complete search history.

(56) References Cited

U.S. PATENT DOCUMENTS

| | | | |
|---|---|---|---|
| 6,233,611 B1 | 5/2001 | Ludtke et al. | |
| 7,983,285 B2 | 7/2011 | Lee et al. | |
| 8,019,833 B2 | 9/2011 | Suzuki | |
| 2002/0026494 A1* | 2/2002 | Suzuki | 709/214 |
| 2004/0047298 A1* | 3/2004 | Yook et al. | 370/254 |
| 2004/0059817 A1 | 3/2004 | Ueno et al. | |
| 2006/0217116 A1 | 9/2006 | Cassett et al. | |
| 2007/0156656 A1* | 7/2007 | Pather et al. | 707/3 |
| 2007/0207727 A1 | 9/2007 | Song et al. | |
| 2008/0310425 A1* | 12/2008 | Nath et al. | 370/395.54 |

(Continued)

FOREIGN PATENT DOCUMENTS

| CN | 1437813 A | 8/2003 |
|---|---|---|
| KR | 10-2002-0015273 A | 2/2002 |

(Continued)

OTHER PUBLICATIONS

Search Report dated Aug. 27, 2009 issued by the International Searching Authority.
Communication, dated Oct. 9, 2012, issued by the State Intellectual Property Office of the People's Republic of China in counterpart Chinese Patent Application No. 200980103126.9.

(Continued)

*Primary Examiner* — Andy Ho
*Assistant Examiner* — Abdou Seye
(74) *Attorney, Agent, or Firm* — Sughrue Mion, PLLC

(57) ABSTRACT

Provided are a method and apparatus for notifying a specific device, which requests a service, of an event if the event relating to the service occurs in a home network. An event notification message that is multicasted in the home network includes a device ID that requests a service relating to an event, and devices discard the event notification message when the device ID included in the event notification message is not identical to IDs of the devices, thereby preventing all devices that are not related to the service from being notified of the event relating to the service.

20 Claims, 5 Drawing Sheets

(56) References Cited

U.S. PATENT DOCUMENTS

| | | | | |
|---|---|---|---|---|
| 2009/0070458 A1* | 3/2009 | Fuse et al. | .................... | 709/224 |
| 2009/0160635 A1* | 6/2009 | Bopardikar | .................... | 340/531 |
| 2009/0193469 A1* | 7/2009 | Igarashi | .......................... | 725/56 |
| 2009/0239502 A1* | 9/2009 | Dempo et al. | ................ | 455/411 |

FOREIGN PATENT DOCUMENTS

| | | |
|---|---|---|
| KR | 10-2003-0089126 A | 11/2003 |
| KR | 10-2004-0027926 A | 4/2004 |
| KR | 10-2006-0001550 A | 1/2006 |
| KR | 10-2006-0101319 A | 9/2006 |
| KR | 10-0636380 B1 | 10/2006 |
| KR | 10-2007-0108309 A | 11/2007 |
| WO | 02/060124 A2 | 8/2002 |
| WO | WO 2006112381 A1 * | 10/2006 |
| WO | WO 2007105568 A1 * | 9/2007 |

OTHER PUBLICATIONS

Communication, Jun. 17, 2014, Issued by the State Intellectual Property Office of the People's Republic of China, in counterpart Chinese Patent Application No. 200980103126.9.

Communication issued Sep. 26, 2014, by the Korean Patent Office in related Application No. 10-2008-0058019.

Communication dated Dec. 18, 2014 form the European Patent Office in counterpart European Patent Application No. 09703206.4.

Consumer Electronics Association, Web-based Protocol and Framework for Remote User Interface on UPnP$^{TM}$ Networks and the Internet (Web4CE), Jul. 2007, 176 pages; CEA-2014-A.

Communication dated Mar. 27, 2015 issued by the Korean Intellectual Property Office in counterpart Korean Patent Application No. 10-2008-0058019.

* cited by examiner

METHOD AND APPARATUS FOR PROCESSING EVENT IN HOME NETWORK

CROSS-REFERENCE TO RELATED PATENT APPLICATION

This application claims the benefit of U.S. Provisional Application No. 61/023,642 filed on Jan. 25, 2008 in the USPTO and Korean Patent Application No. 10-2008-0058019, filed on Jun. 19, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to a home network, and more particularly, to notifying a device of a home network of an event when the event occurs with respect to a service that is provided to the device.

2. Description of the Related Art

As various home electronic devices have an enhanced networking function, a home network needs various types of devices. Thus, users can use various services provided by another device in the home network or an external service provider of the home network. There is a need of notifying all of home network devices (hereinafter referred to as "devices") of an event that occurs with respect to a single service.

Since the home network is a user's area, a user prefers to be informed of all events that occur with respect to a service used by the user within the home network, irrespective of a type of a device currently occupied by the user. In more detail, the user may be notified, in real-time, of an event that occurs with regard to another device that is not occupied by the user.

An example of a home network specification adopting such framework is the Consumer Electronics Association (CEA)-2014. The CEA-2014 publishes technologies relating to the use of a service provided by another device of a home network or a server over the Internet through a remote user interface in a home electronic device, such as a digital television (TV). A more detailed description is disclosed in the CEA-2014 and thus it is not repeated here.

FIG. 1 is a block diagram of explaining a related art method of notifying an event in a home network. The home network is a CEA-2014 based network and the method is excerpted from the CEA-2014 specification.

In operation 0, a remote user interface client (RUIC) forms an RUI session with a remote user interface server (RUIS). That is, the RUIC displays a UI page of the RUIS in the format of an extensible hypertext markup language (XHTML). A user uses a service of the RUIS through the UI page.

In operation 1, an event occurs in a service of another RUIS and is notified of the RUIC. The RUIS in which the event occurs is a $3^{rd}$ party that does not form the RUIS session with the RUIC.

In operation 2, a $3^{rd}$ party event handler of the RUIC invokes an XHTML browser.

In operations 3 and 4, the XHTML browser browses the XHTML page including an event from the $3^{rd}$ party through an HTTP GET instruction. For reference, a uniform resource locator (URL) of the XHTML page including the event is contained in an event notification page that the $3^{rd}$ party transmits to the RUIC in operation 1.

As described above, since all home network devices in the home network adopting a $3^{rd}$ party event notification framework are notified of an event, the user can be informed of the occurrence of all events through any home network device. However, when a user authentication or a device authentication is necessary, such a feature can be disadvantageous. A specific example is shown in FIG. 2.

FIG. 2 is a diagram for explaining a problem of the related art method. Referring to FIG. 2, devices of a home network 210 use an Internet Protocol Multimedia Subsystem (IMS) based service of an IMS network 220 through an IMS gateway 211 that functions as an RUIS. The IMS network 220, which is a network under the specification suggested by a $3^{rd}$ Generation Partnership Project (3GPP), provides a variety of packet based services, such as an instant messenger, a voice over Internet protocol (VoIP), a conference call, etc. A session for the IMS based service is managed by a call session control function (CSCF) server 221. A user authentication is necessary for establishing the session.

A digital TV 212, which functions as an RUIC 1, is in a VoIP incoming notification service of the IMS gateway 211, and even if a personal media player (PMP) 213, which functions as an RUIC 2, is not authorized for the IMS based service, a VoIP incoming occurs. Since only the digital TV 212 is authorized for the VoIP incoming notification service, the digital TV 212 should not share information regarding the VoIP incoming notification service with other devices of the home network 210. However, as described above, when the home network 210 follows a $3^{rd}$ party event notification, since all events are multi-casted, the PMP 213 is notified of an event of the VoIP incoming.

Also, when a person (e.g., a member of a user's family) uses the PMP 213, other than the user of the digital TV 212, there is a high possibility that the person does not need the event of the VoIP incoming. Rather, an event notification message may interrupt the person who sees a movie through the PMP.

In more detail, the related art method has a problem that an event is notified of devices that do not request a corresponding service when the event relating to a service occurs in a home network where a $3^{rd}$ party event is notified by means of multicast.

SUMMARY OF THE INVENTION

The present invention provides a method and apparatus for notifying a specific device for requesting a service of an event when the event relating to the service occurs in a home network.

According to an aspect of the present invention, there is provided a method of notifying a second device of an event by a first device in a home network, the method comprising: generating mapping information which relates information regarding a service the second device has requested from the first device to an identifier (ID) of the second device; when an event occurs in the service, generating an event notification message including the ID of the second device by referring to the mapping information; and multicasting the event notification message to devices of the home network.

The method may further comprise: based on whether the service requires a user authentication, generating importance information indicating whether the devices of the home network need to refer to the ID of the second device included in the event notification message, wherein the event notification message further comprises the importance information.

The home network may abide by the CEA-2014 specification, the first device may be an RUIS, and the second device may be an RUIC.

The service may be an IMS service, and the first device may be an IMS gateway that provides the home network with the IMS service.

According to another aspect of the present invention, there is provided a computer readable recording medium having a recorded program for executing the method.

According to another aspect of the present invention, there is provided an apparatus for notifying a second device of an event by a first device in a home network, the apparatus comprising: a mapping information generating unit which generates mapping information which relates information regarding a service that the second device has requested from the first device to an ID of the second device; an event notification message generating unit which generates an event notification message including the ID of the second device by referring to the mapping information when an event occurs in the service; and an event notifying unit which multicasts the event notification message to devices of the home network.

The apparatus may further comprise: an importance information generating unit, which, based on whether the service requires a user authentication, generates importance information indicating whether the devices of the home network need to refer to the ID of the second device included in the event notification message, wherein the event notification message further comprises the importance information.

According to another aspect of the present invention, there is provided a method of receiving an event by a first device from a second device that provides a predetermined service in a home network, the method comprising: transmitting an ID of the first device to the second device through a message requesting the predetermined service; extracting importance information indicating whether devices of the home network need to refer to a device ID included in an event notification message that is multicasted by the second device from the event notification message; and determining whether to accept the event notification message irrespective of the device ID included in the event notification message based on the importance information.

The method may further comprise: extracting the device ID from the event notification message when it is determined that it is necessary to refer to the device ID included in the event notification message; comparing the extracted device ID with an ID of the first device; and selectively discarding the event notification message based on the comparison result.

According to another aspect of the present invention, there is provided an apparatus for receiving an event by a first device from a second device that provides a predetermined service in a home network, the apparatus comprising: a service requesting unit which transmits an ID of the first device to the second device through a message requesting the predetermined service; an importance information extracting unit which extracts importance information indicating whether devices of the home network need to refer to a device ID included in an event notification message that is multicasted by the second device from the event notification message; and a determining unit which determines whether to accept the event notification message irrespective of the device ID included in the event notification message based on the importance information.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. Although a home network abiding by the CEA-2014 specification will now be described, it would have been obvious to one of ordinary skill in the art that the present invention can be applied to a home network that uses various frameworks and protocols.

Figure 1:
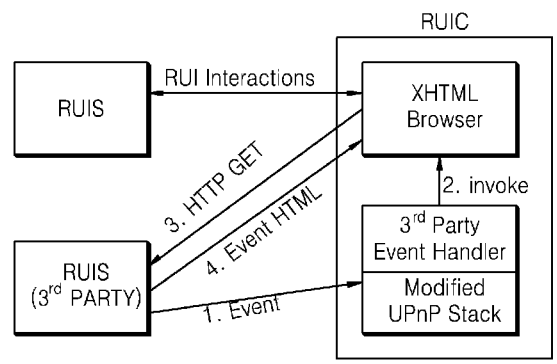
FIG. 1 is a block diagram of explaining a related art method of notifying an event in a home network.
Figure 2:
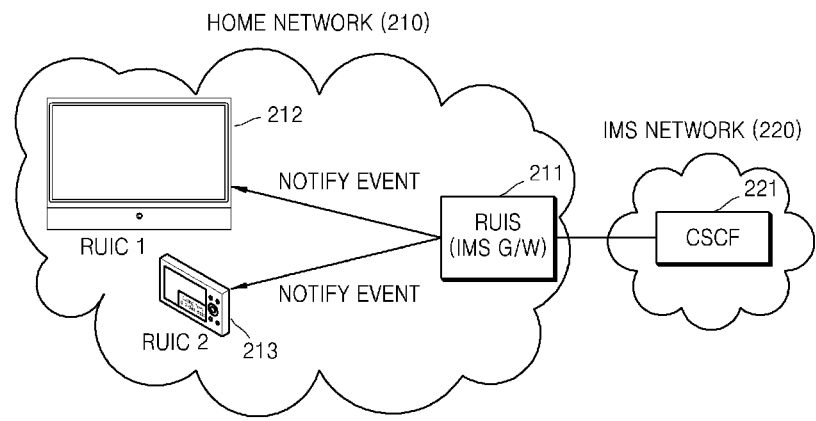
FIG. 2 is a diagram for explaining a problem of the related art method.
Figure 3:
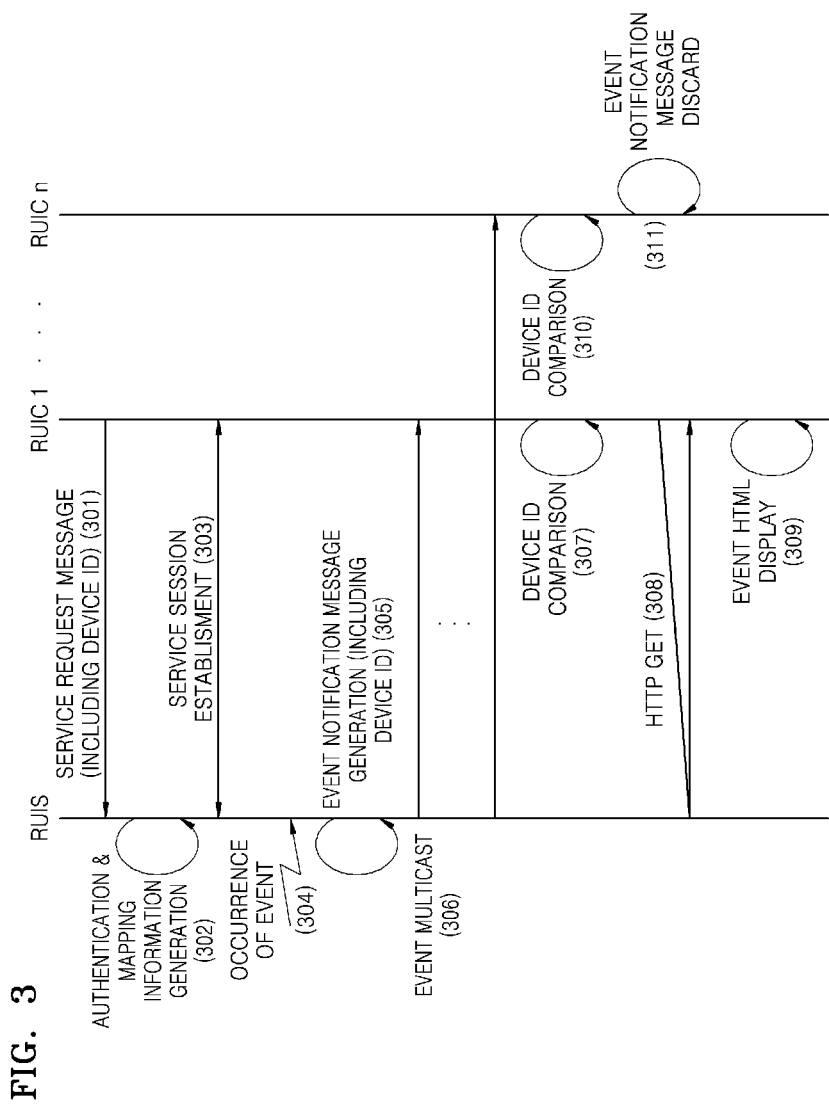
FIG. 3 is a flowchart illustrating a method of notifying an event according to an exemplary embodiment of the present invention.

FIG. 3 is a flowchart illustrating a method of notifying an event according to an exemplary embodiment of the present invention. Referring to FIG. 3, in operation 301, an RUIC 1 transmits a service request message to an RUIS. The service request message includes a device ID of the RUIC 1. In this regard, a service may be provided from the inside of a home network or from the outside of the home network.

In operation 302, the RUIS uses authentication information included in the service request message to perform a user authentication. The RUIS generates mapping information which relates the service information regarding the requested service to the device ID of the RUIC 1.

In operation 303, the RUIS and the RUIC 1 form a session for the service, i.e. an RUI session.

In operation 304, an event occurs in the service requested by the RUIC 1.

In operation 305, the RUIS generates an event notification message by referring to the mapping information. In more detail, the RUIS searches for a device ID that requests the service in which the event occurs, and includes the device ID in the event notification message.

In operation 306, the RUIS multicasts the event notification message to devices RUIC 1 to RUIC n of the home network.

In operation 307, the RUIC 1 extracts a device ID from the event notification message and compares the extracted ID of the device with the device ID of the RUIC 1.

In operation 308, the RUIC that confirms that the device ID included in the event notification message is identical to the device ID of the RUIC 1 uses an HTTP GET instruction to obtain an event XHTML document from the RUIS.

In operation 309, the RUIC 1 displays the event XHTML document to notify the user of the event.

In operation 310, like the RUIC 1, other RUICs extract a device ID from the event notification message and compare the device ID with each device ID of other RUICs.

In operation 311, other RUICs confirm that the device ID included in the event notification message is not identical to each device ID of other RUICs, and discard the event notification message.

In the home network of the present exemplary embodiment, a framework in which an event is notified by multicast does not change, and a device ID included in an event notification message is used to notify a specific device related to a service in which an event occurs, of the event.

When a service does not require an authentication, all devices are required to receive the event notification message. In this regard, importance information indicating whether an event notification is received irrespective of the device ID included in the event notification message may be contained in the event notification message.

Figure 4:
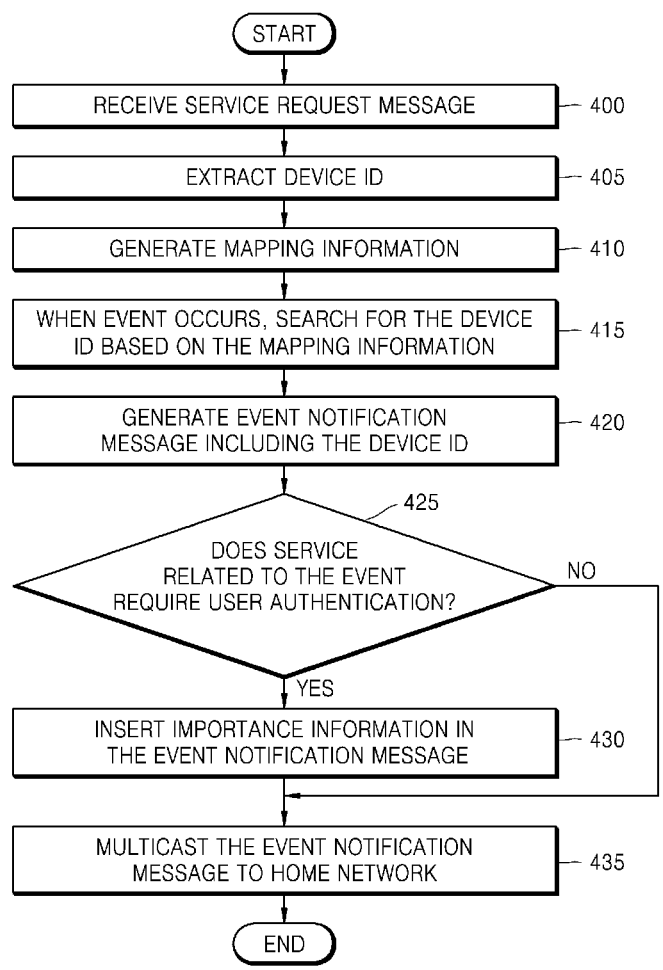
FIG. 4 is a flowchart illustrating a process of notifying an event according to an exemplary embodiment of the present invention.

FIG. 4 is a flowchart illustrating a process of notifying an event according to an exemplary embodiment of the present invention. The process is performed by a first device that provides a second device with a service in a home network.

In operation 400, the first device receives a service request message from the second device.

In operation 405, the first device extracts a device ID from the service request message. The extracted device ID is an ID of the second device.

In operation 410, the first device generates mapping information by mapping information regarding a service requested by the second device to the device ID of the second device.

In operation 415, when an event occurs with regard to the service provided by the first device, the mapping information is used to search for a device ID of a device that requests the service.

In operation 420, the first device generates an event notification message including the device ID of the device that requests the service and importance information.

If the service in which the event occurs does not require the user authentication (NO in operation 425), the first device multicasts the event notification message to the home network (operation 435), and all devices of the home network accept the event notification message irrespective of the device ID contained in the event notification message.

Meanwhile, if the service in which the event occurs requires the user authentication (YES in operation 425), the importance information is inserted in the event notification message (operation 430), and the first device multicasts the event notification message to the home network (operation 435). All devices of the home network compare the device ID contained in the event notification message with IDs of the devices, and when the device ID is not identical to IDs of the devices, the event notification message is discarded.

As described above, the importance information indicates whether devices accept the event notification message irrespective of the device ID included in the event notification service depending on whether the service in which the event occurs requires the user authentication.

Figure 5:
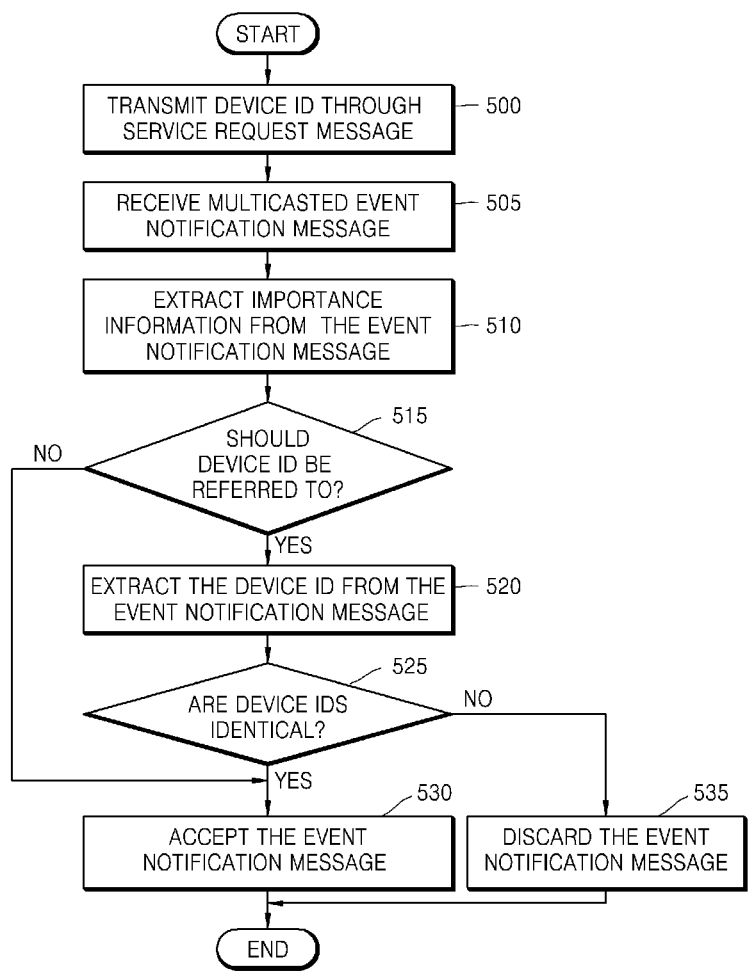
FIG. 5 is a flowchart illustrating a process of receiving an event notification message according to an exemplary embodiment of the present invention.

FIG. 5 is a flowchart illustrating a process of receiving an event notification message according to an exemplary embodiment of the present invention. The process is performed by a second device that receives a service from a first device in a home network.

In operation 500, the second device transmits an ID thereof to the first device through a service request message.

In operation 505, the second device receives an event notification message that is multicasted by the first device. The receiving of the event notification message does not mean the accepting of the event notification message but means that a signal indicating the event notification message physically arrives at the second device in view of the characteristics of a wireless medium.

In operation 510, the second device extracts importance information from the event notification message.

In operation 515, the second device determines whether to refer to a device ID included in the event notification message based on the importance information. If the second device determines that it is unnecessary to refer to the device ID included in the event notification message based on the importance information, in operation 530, the second device accepts the event notification message.

If the second device determines that it is necessary to refer to the device ID included in the event notification message based on the importance information, in operation 520, the second device extracts the device ID from the event notification message.

In operation 525, the second device compares the device ID extracted from the event notification message with the ID of the second device in order to determine whether the device ID extracted from the event notification message is identical to the ID of the second device. If the device ID extracted from the event notification message is identical to the ID of the second device, the second device proceeds to operation 530.

If the device ID extracted from the event notification message is not identical to the ID of the second device, in operation 535, the second device discards the event notification message.

Figure 6:
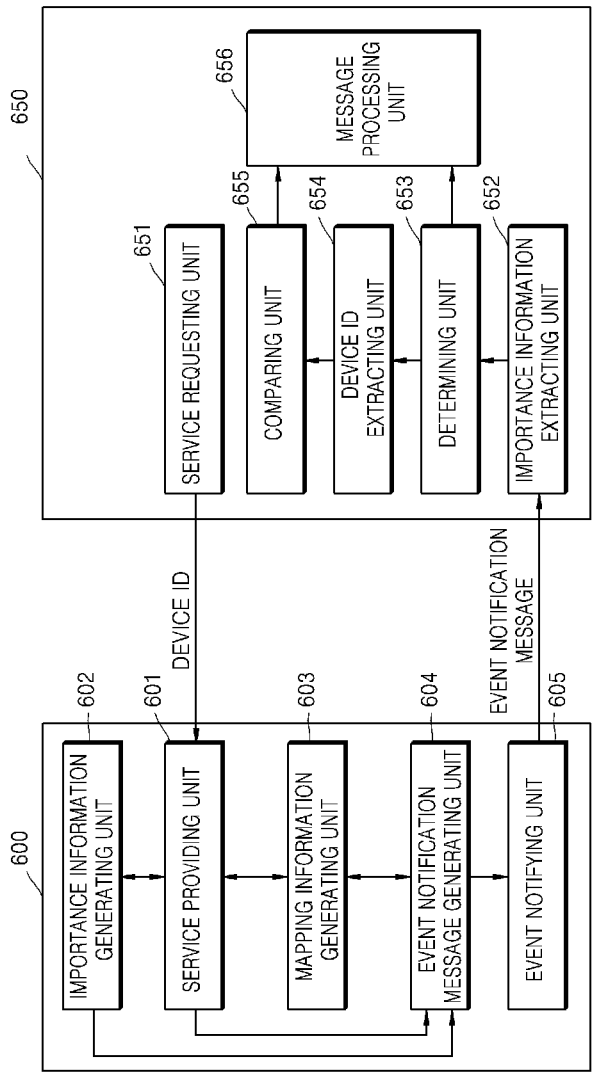
FIG. 6 is a block diagram of two devices of a home network according to an exemplary embodiment of the present invention.

FIG. 6 is a block diagram of a device 600 (hereinafter referred to as "first device") that notifies an event and a device 650 (hereinafter referred to as "second device") that receives an event notification message in a home network according to an exemplary embodiment of the present invention. Referring to FIG. 6, the first device 600 comprises a service providing unit 601, an importance information generating unit 602, a mapping information generating unit 603, an event notification message generating unit 604, and an event notifying unit 605.

The service providing unit 601 receives a service request message that requests a service of the first device 600 from the second device 650.

As described above, the requested service may be provided from the outside of the home network. At this time, the first device 600 functions as a home network gateway with regard to the service. The service request message includes an ID of the second device 650.

The importance information generating unit 602 analyzes the service request message and generates importance information based on whether the service requested by the second device 650 requires a user authentication.

The mapping information generating unit 603 analyzes the service request message and generates mapping information by mapping information regarding the requested service to the ID of the second device 650.

The event notification message generating unit 604 generates an event notification message including an ID of a corresponding device and the importance information based on the mapping information when an event occurs with regard to a service provided by the first device 600 to the home network.

The event notifying unit 605 multicasts the event notification message that is generated by the event notification message generating unit 604 to devices of the home network.

The second device 650 comprises a service requesting unit 651, an importance information extracting unit 652, a determining unit 653, a device ID extracting unit 654, a comparing unit 655, and a message processing unit 656.

The service requesting unit 651 generates a service request message for requesting a service of the first device 600 and transmits the service request message to the first device 600. The service request message includes an ID of the second device 650.

The importance information extracting unit 652 extracts importance information from the event notification message that is multicasted by the first device 600.

The determining unit 653 analyzes the extracted importance information and determines whether to extract a device ID from the event notification message, i.e., whether to refer to the device ID in order to accept the event notification message.

The device ID extracting unit 654 extracts the device ID from the event notification message when the determining unit 653 determines that it is necessary to refer to the device ID.

The comparing unit 655 compares the device ID extracted from the event notification message by the device ID extracting unit 654 with the ID of the second device 650.

The message processing unit 656 accepts the event notification message when the determining unit 653 determines that it is unnecessary to refer to the device ID. Also, when the device ID extracted from the event notification message is identical to the ID of the second device 650 based on the comparison result of the comparing unit 655, the message processing unit 656 accepts the event notification message. When the event notification message is accepted, the message processing unit 656 performs a routine relating to the occurrence of an event according to a general procedure.

When the device ID extracted from the event notification message is not identical to the ID of the second device 650 based on the comparison result of the comparing unit 655, the message processing unit 656 discards the event notification message.

The present invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices.

The present invention can also be embodied as computer readable code on a computer readable transmission media, such as carrier waves.

According to exemplary embodiments of the present invention, since an event that is not related to a service that is currently used by a user is displayed on a device in a home network, the user is not interrupted while using the current service, and, when a service requires authentication, it is possible to prevent information relating to the service from being shared with all devices of the home network that are not authorized for the service.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of notifying a second device of an event by a first device, the method comprising:
   receiving, by the first device from the second device, a service request message that requests a service and includes an unique identifier (ID) that uniquely identifies the second device;
   generating, in response to the service request message, mapping information which relates the unique ID of the second device to information regarding the service that the second device has requested;
   in response to an occurrence of an event related to the service, generating an event notification message including the unique ID of the second device by referring to the mapping information; and
   multicasting the event notification message to a plurality of devices including the second device,
   wherein the event notification message is selectively discarded or accepted by the plurality of devices based on the unique ID included in the event notification message.

2. The method of claim 1, further comprising:
   generating importance information indicating whether the plurality of devices need to refer to the unique ID of the second device included in the event notification message,
   wherein the event notification message further comprises the importance information.

3. The method of claim 2, wherein:
   when the service requires a user authentication, the importance information indicates that the plurality of devices need to refer to the unique ID of the second device to accept the event notification message, and
   when the service does not require the user authentication, the importance information indicates that the plurality of devices accept the event notification message irrespective of the unique ID of the second device.

4. The method of claim 1, wherein the first device and the second device are coupled in a home network according to a Consumer Electronics Association (CEA)-2014 specification, the first device is a remote user interface server (RUTS), and the second device is a remote user interface client (RUIC).

5. The method of claim 1, wherein the service is an Internet Protocol multimedia subsystem (IMS) service, and the first device is an IMS gateway.

6. A first device for notifying a second device of an event, the first device comprising:
   a receiver configured to receive, from the second device, a service request message that requests a service from the first device and includes an unique identifier (ID) that uniquely identifies the second device;
   a processor configured to generate, in response to the service request message, mapping information which relates the unique ID of the second device to information regarding the service that the second device has requested and generate, in response to an occurrence of an event related to the service, an event notification message including the unique ID of the second device by referring to the mapping information; and
   a transmitter configured to multicast the event notification message to a plurality of devices including the second device,
   wherein the event notification message is selectively discarded or accepted by the plurality of devices based on the unique ID included in the event notification message.

7. The first device of claim 6,
   wherein the processor is configured to generate importance information indicating whether the plurality of devices need to refer to the unique ID of the second device included in the event notification message,
   wherein the event notification message further comprises the importance information.

8. The first device of claim 7, wherein:
   when the service requires a user authentication, the importance information indicates that the plurality of devices need to refer to the unique ID of the second device to accept the event notification message, and
   when the service does not require the user authentication, the importance information indicates that the plurality of devices accept the event notification message irrespective of the unique ID of the second device.

9. The first device of claim 6, wherein the first device and the second device are coupled in a home network according to a Consumer Electronics Association (CEA)-2014 specification, the first device is a remote user interface server (RUIS), and the second device is a remote user interface client (RUIC).

10. The first device of claim 6, wherein the service is an Internet Protocol multimedia subsystem (IMS) service, and the first device is an IMS gateway.

11. The first device of claim 6, wherein the processor is configured to generate the event notification message by, when the event occurs in the service, searching in the mapping information for an unique identifier (ID) that corresponds to the service in which the event occurs, and including the unique ID in the event notification message.

12. A method of receiving an event by a second device from a first device, the method comprising:
   transmitting, to the first device, a service request message that requests the service and includes an unique identifier (ID) that uniquely identifies the second device;
   receiving a multicast event notification message from the first device, the multicast event notification message being generated based on mapping information which relates the unique ID of the second device to information regarding the service that the second device has requested;
   verifying whether the unique ID included in the multicast event notification message indicates the second device; and
   discarding the event notification message if the unique ID does not indicate the second device.

13. The method of claim 12, further comprising:
   extracting, from the multicast event notification message, importance information indicating whether the second device needs to refer to the unique device ID included in the event notification message; and
   determining whether to accept the event notification message based on the importance information.

14. The method of claim 12, wherein the first device and the second device are coupled in a home network according to a Consumer Electronics Association (CEA)-2014 specification, the first device is a remote user interface client (RUIC), and the second device is a remote user interface server (RUIS).

15. The method of claim 12, wherein the predetermined service is an IMS service, and the first device is an IMS gateway.

16. A second device for receiving an event from a first device that provides a service, the second device comprising:
   a transmitter configured to transmit, to the first device, a service request message that requests the service from the first device and includes an unique identifier (ID) that uniquely identifies the second device;
   a receiver configured to receive a multicast event notification message from the first device, the multicast event notification message being generated based on mapping information which relates the unique ID of the second device to information regarding the service that the second device has requested;
   a processor configured to verify whether the unique ID included in the multicast event notification message indicates the second device and discard the event notification message if the unique ID does not indicate the second device.

17. The first device of claim 16,
   wherein the processor is configured to extract, from the multicast event notification message, importance information indicating whether the second device needs to refer to a unique device ID included in the event notification message and
   to determine whether to accept the event notification message based on the importance information.

18. The first device of claim 16, wherein the first device and the second device are coupled in a home network according to a CEA-2014 specification, the first device is an RUIC, and the second device is an RUIS.

19. The second device of claim 16, wherein the predetermined service is an IMS service, and the first device is an IMS gateway.

20. A computer-readable recording medium having recorded thereon a computer program for executing a method comprising:
   receiving, by a first device from a second device, a service request message that requests a service and includes an unique identifier (ID) that uniquely identifies the second device;
   generating, in response to the service request message, mapping information which relates the unique ID of the second device to information regarding the service that the second device has requested;
   in response to an occurrence of an event related to the service, generating an event notification message including the unique ID of the second device by referring to the mapping information; and
   multicasting the event notification message to a plurality of devices including the second device,
   wherein the event notification message is selectively discarded or accepted by the plurality of devices based on the unique ID included in the event notification message.

* * * * *